April 21, 1936.   A. G. SIEBENLIST   2,038,389
LOCK JOINT SEAM FOR PIPE
Filed Dec. 10, 1934   2 Sheets-Sheet 1

INVENTOR.
Anthony G. Siebenlist
BY
ATTORNEY.

April 21, 1936.  A. G. SIEBENLIST  2,038,389
LOCK JOINT SEAM FOR PIPE
Filed Dec. 10, 1934   2 Sheets-Sheet 2
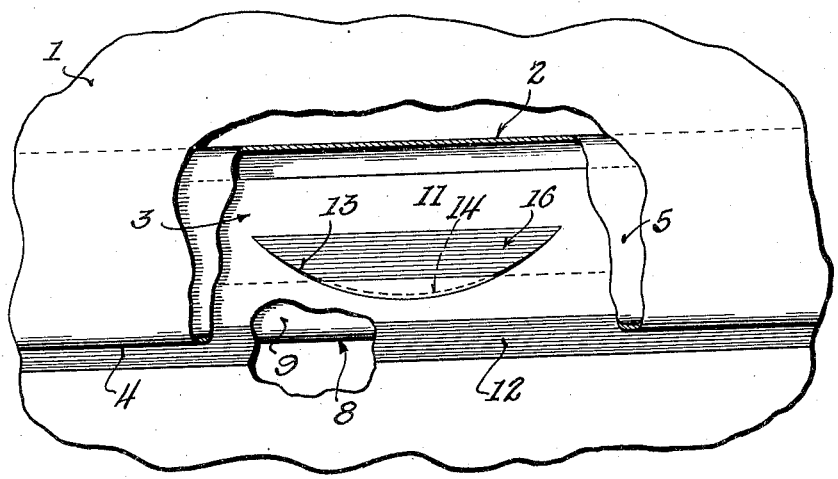
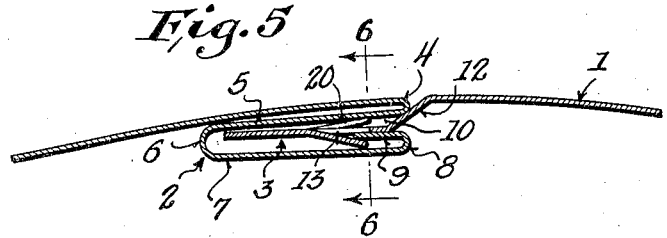
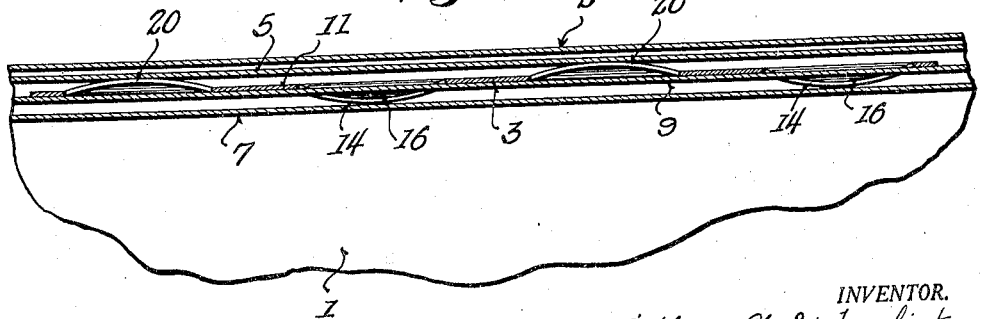
INVENTOR.
Anthony G. Siebenlist
BY
ATTORNEY.

Patented Apr. 21, 1936

2,038,389

UNITED STATES PATENT OFFICE 2,038,389

LOCK JOINT SEAM FOR PIPE

Anthony G. Siebenlist, Milwaukee, Wis., assignor to Milcor Steel Company, Milwaukee, Wis., a corporation of Delaware Application December 10, 1934, Serial No. 756,719

3 Claims. (Cl. 138—74)

This invention relates generally to sheet metal pipe such as stovepipe or the like and is concerned more particularly with a lock joint seam for such pipe.

The type of pipe in which the present invention is embodied is designed to be shipped nested in suitable packages or cartons and assembled at the point of seal or use.

Among the objects of the present invention are to provide a pipe of this character which may be readily and economically produced, which has its seam members or formations so constituted as to be susceptible of easy and quick assembly but which, when assembled, provide a permanent and smoke tight seam or joint, one which will not come apart under forces met with in transportation or use and which, in fact, is so positive and secure, that it cannot be taken apart.

Along with these advantages the seam formations require but the minimum amount of metal and present no sharp edges in such manner as to be liable to injure the person assembling the pipe. No special skill or tool is required to interfit the seam members and complete the joint.

The desirable locking action is had by a novel interengagement of raw edges so related as to increase the security of the interlock under the influence of strains tending to open up the joint and also so related and positioned as to bring into play the strongest characteristics of the metal making up the edges in resisting the strains and stresses placed thereon. When the pipe is assembled a smooth joint flush with the exterior wall of the pipe is had.

Other objects and advantages reside in certain novel features of the construction, arrangement and combination of parts, which will be hereinafter more fully described and particularly pointed out in the appended claims, reference being had to the accompanying drawings forming a part of this specification, and in which:

Figure 4 is a fragmentary view on an enlarged scale, partly in elevation and partly in section;

Figure 5 is a view similar to Figure 3 of a modified form of the invention; and

Figure 6 is a view in longitudinal section taken on line 6—6 of Figure 4.

Figure 1:
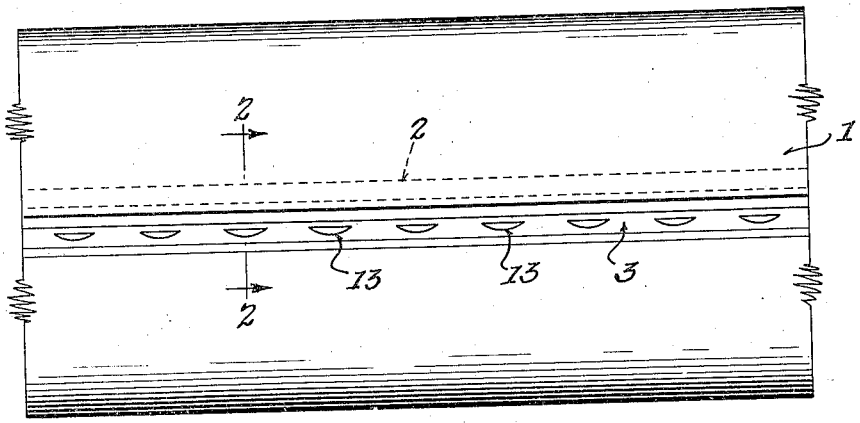
Figure 1 is a fragmentary view in elevation showing a pipe section having a joint embodying the present invention, the joint being shown open.
Figure 2:
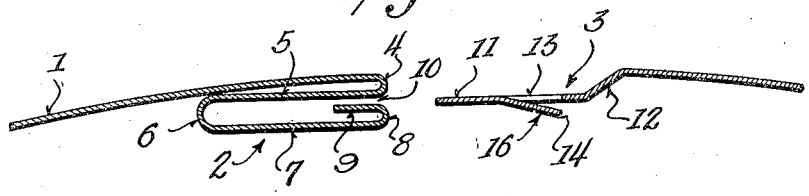
Figure 2 is a sectional view taken on line 2—2 of Figure 1.
Figure 3:
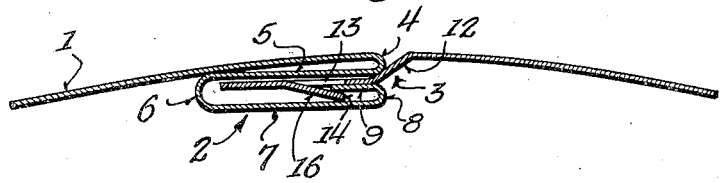
Figure 3 is a view similar to Figure 2 but showing the seam members interlocked and the joint closed.

Referring to the drawings, the numeral 1 designates a pipe section which, as usual, is made up from a rectangular sheet of metal of appropriate gauge and resiliency. Generally speaking, interlocking formations are formed along the edges of the pipe section and these interlocking formations comprise a female member or resilient socket 2 and a cooperable male member 3.

The female member 2 is formed by folding one edge of the pipe inwardly upon itself as indicated at 4, thus forming a wall 5. The pipe is refolded as at 6 to form an inner wall 7. The outer edge portion of this inner wall 7 is turned inwardly at 8 to provide a locking flange 9 spaced slightly from its wall 7. The bend or fold 8 lies inwardly of and may be in substantially the same radial plane as the first fold or bend 4 and this locates the mouth or entrance 10 of the female or socket member 2 within the confines of the pipe and in such relation to the male member 3 that the male member may be entered thereinto by moving the male and female members toward each other in a path circumferentially of the pipe section. This movement need not be imparted to the entire length of the pipe section simultaneously but may be imparted to the male and female members progressively from one end of the pipe to the other.

The male member 3 is made up of a tongue 11 which is offset from the main wall of the pipe by an angled or sloping portion 12. At spaced intervals along the tongue 11 incisions 13 are made therein. These incisions or slits are preferably of curved or arcuate form and present a crescent-like appearance and similarly shaped edge 14. The metal of the tongue adjacent each incision 13 is displaced or pressed inwardly as at 15 so as to locate the edges 14 inwardly of the inner wall of the tongue 11 and so as to provide locking clips or tabs 16.

With this construction, when the tongue 11 of the male member 3 is moved into the mouth 10' of the pocket 10 the edges 14 snap under the inner edge portions of the locking flange 9 and permanently interlock the seam members together. As each tab 16 is moved into place it comes into effective locking action and cannot be accidentally disengaged. This facilitates assembly in that the possibility of the pipe springing open after it has been locked part way along its length is avoided. In moving in through the mouth of the pocket each tab or clip 16 flexes or displaces the inner wall 7 of the pocket sufficiently to enable the tab or clip to pass into position just behind the locking flange 9 and as soon as the edge 14 passes the flange 9 the resiliency of the parts and the pressure exerted on the sloping portion of the male member by the first fold or bend 4 causes the edge 14 to snap and hook under the flange 9 and the parts are permanently locked together.

The tongue 11 and pocket 10 are so dimensioned and the tabs 16 and locking flange 9 are so related that the parts are not only held against pulling apart but against longitudinal shifting. This is entirely true of the structure just described which is a preferable construction but if desired a further frictional effect may be set up between the members of the seam or joint by outwardly displacing portions 20 of the tongue in between the locking tabs 16 as illustrated in Figures 4 and 5. These outwardly displaced portions 20 do not have a locking action but merely set up additional frictional engagement between the members of the joint.

It will be appreciated that an important feature of the invention resides in the novel and advantageous character of the lock set up between the edge of the locking flange and the edge surfaces presented to said locking flange edge by the ends of the incisions from which the locking tabs are displaced. Another factor in obtaining a thoroughly effective and reliable lock is the engagement of the locking tabs with the undersurface of the locking flange. By having the offset or sloping portion 12 disposed to be pressed against by the first bend in the closed position of the seam, proper interlock is assured and a better joint is had. Then again, the offset portion 12 provides for a substantially smooth, flush and unbroken joint. It should be noted also that in the assembly the incisions are entirely contained in and enclosed by the imperforate walls of the female member.

While I have shown and described several constructions in which the invention may be advantageously embodied, it is to be understood that these constructions have been selected merely for the purpose of illustration or example and that various changes in the size, shape and arrangement of the parts may be made without departing from the spirit of the invention or the scope of the subjoined claims.

The invention claimed is:

1. A pipe section having one edge folded inwardly upon itself and then refolded to provide spaced walls enclosing a pocket, the inner wall having its edge folded inwardly and providing a flange spaced from the walls of the pocket, said first and last folds being disposed in substantially radial alignment and defining the mouth of the pocket, the other edge of the pipe being offset inwardly to provide a tongue, said tongue being insertable in said pocket and having spaced incisions, the material of the tongue adjacent said incisions being depressed inwardly so that when said tongue is inserted in said socket the stiff edges of said displaced portions will engage under the flange to lock the edges of the pipe section together.

2. A pipe section having one edge folded inwardly upon itself and then refolded to provide spaced walls enclosing a pocket, the inner wall having its edge folded inwardly and providing a locking flange spaced from the walls of the pocket, the other edge of the pipe being offset inwardly to provide a tongue, there being a sloping connecting portion between said tongue and the main portion of the pipe, said sloping connecting portion being engaged and pressed inwardly by said first-named fold when said tongue is inserted in said pocket and rigid locking members on said tongue engageable with said locking flange.

3. A pipe section having one edge folded inwardly upon itself and then refolded to provide a pocket defined by spaced walls, said edge terminating within the pocket in spaced relation to the walls thereof, said pipe section adjacent to its other edge being offset inwardly to provide a tongue insertable within the pocket, said tongue being provided with inclined lugs engageable with the edge within the pocket when the tongue is inserted therein, said tongue being connected to the pipe section by an inclined portion engageable with the first mentioned fold when the tongue is inserted within the pocket, the connecting portion and the lugs being oppositely inclined whereby to press the tongue into firm engagement with the walls of the pocket.

ANTHONY G. SIEBENLIST.